US008826962B2

(12) United States Patent
Bonacini

(10) Patent No.: US 8,826,962 B2
(45) Date of Patent: *Sep. 9, 2014

(54) UPGRADED BEAD BREAKING UNIT FOR TYRE CHANGING MACHINES OR THE LIKE

(75) Inventor: Maurizio Bonacini, Correggio (IT)

(73) Assignee: Giuliano Group S.p.A., Correggio (RE) (IT)

(*) Notice: Subject to any disclaimer, the term of this patent is extended or adjusted under 35 U.S.C. 154(b) by 225 days.

This patent is subject to a terminal disclaimer.

(21) Appl. No.: 13/429,675

(22) Filed: Mar. 26, 2012

(65) Prior Publication Data

US 2012/0298312 A1 Nov. 29, 2012

(30) Foreign Application Priority Data

May 24, 2011 (IT) .............................. MO2011A0132

(51) Int. Cl.
*B60C 25/125* (2006.01)
*B60C 25/13* (2006.01)

(52) U.S. Cl.
CPC ...................................... *B60C 25/13* (2013.01)
USPC ........................................ 157/1.17; 157/1.28

(58) Field of Classification Search
USPC ............................... 157/1.17, 1.24, 1.26, 1.28
See application file for complete search history.

(56) References Cited

U.S. PATENT DOCUMENTS

| 5,381,843 | A | 1/1995 | Corghi |
| 5,669,429 | A * | 9/1997 | Gonzaga ....................... 157/1.24 |
| 7,100,660 | B2 | 9/2006 | Corghi et al. |
| 7,500,504 | B2 | 3/2009 | Bonacini |
| 7,591,295 | B2 * | 9/2009 | Bonacini ....................... 157/1.17 |
| 8,408,273 | B2 * | 4/2013 | Bonacini ....................... 157/1.17 |
| 2008/0017324 | A1 * | 1/2008 | Bonacini ....................... 157/1.28 |
| 2011/0139377 | A1 | 6/2011 | Bonacini |

FOREIGN PATENT DOCUMENTS

| EP | 0 557 618 | 9/1993 |
| EP | 1 524 134 | 4/2005 |
| EP | 1 897 707 | 3/2008 |
| EP | 2 338 705 | 6/2011 |

OTHER PUBLICATIONS

Italian Search Report dated Dec. 12, 2011, corresponding to the Foreign Priority Application No. MO20110132.

* cited by examiner

*Primary Examiner* — David B Thomas
(74) *Attorney, Agent, or Firm* — Young & Thompson

(57) ABSTRACT

A bead breaking unit for tire changing machines includes an arm having a bead breaking tool and associated rotatable with a supporting structure between an away position, wherein the tool is spaced out from the supporting structure, and a work position, wherein the tool is near the supporting structure, an actuator apparatus having a mobile element associated sliding with the arm, a dragging device for dragging the arm, associated with the mobile element and suitable for operating during movement of the mobile element from an extracted position to a retracted position to bring the arm to the work position, a coupling device between the mobile element and the arm, suitable for operating during movement of the mobile element from the retracted to the extracted position to bring the arm from the work position to the away position, and a selection device associated with, and suitable for operating/disconnecting the coupling device.

18 Claims, 5 Drawing Sheets

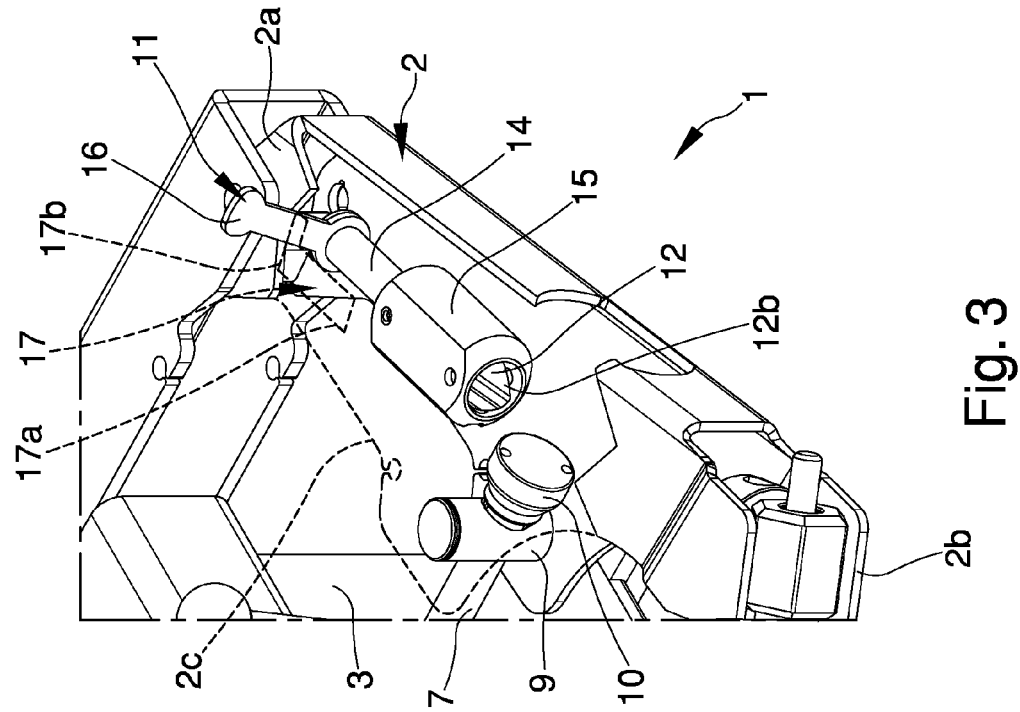
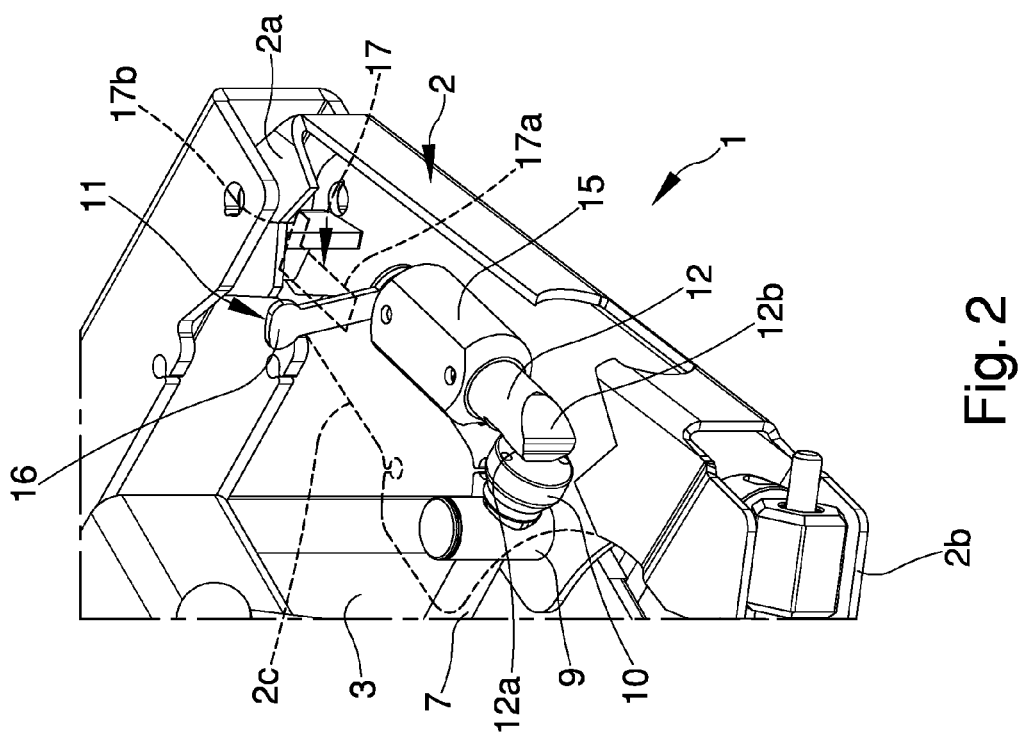

UPGRADED BEAD BREAKING UNIT FOR TYRE CHANGING MACHINES OR THE LIKE

BACKGROUND OF THE INVENTION

1. Field of the Invention

The present invention relates to an upgraded bead breaking unit for tyre changing machines or the like.

2. Description of the Related Art

Tyre changing machines are commonly used for fitting/removing vehicle wheel tyres to/from respective rims As is known, before being able to completely remove a tyre from its housing on the respective rim, it is necessary to detach the beads thereof from the bead retention edges on the rim itself.

This operation is performed by means of a suitable bead breaking unit, normally present on the tyre changing machine itself.

Bead breaking units of known type comprise an arm with a first extremity hinged to the bed of the tyre changing machine according to a substantially vertical axis and a second extremity having a bead breaking tool, otherwise known as blade.

On the bed is fastened a supporting element, usable to correctly fit the rim during the bead breaking operation.

This supporting element has a supporting surface, otherwise known as pad, which is made of suitable material, and usually knurled in such a way as to increase the friction coefficient with the wheel.

The bead breaking units of known type generally comprise a linear actuator of the type, e.g., of a fluid actuator cylinder for moving the arm.

The liner of the actuator cylinder is hinged to the bed and can be rotated around a vertical axis, while the stem is moving between an extracted position and a retracted position and is associated sliding with the arm.

The stem has a driving element which, during movement from the extracted position to the retracted position, is suitable for engaging on the arm to drive it to the bed.

During use, in an idle position of the bead breaking unit, the stem of the cylinder is normally extracted and the arm, which can be freely rotated around its hinging axis, is in a closer position with respect to the bed of the tyre changing machine due to the action of one return spring.

An operator, once the portion of the wheel to undergo bead breaking has been suitably positioned in correspondence to the pad, manually moves the arm until the blade is positioned in contact with a section of the tyre bead.

Subsequently, the operator starts the actuator cylinder, moving the stem from the extracted position to the retracted position.

This way, the arm is driven by the stem and the blade pushes the tyre bead, detaching it from the edge of the rim.

Subsequently, the stem of the actuator cylinder is moved to extracted position and the operator manually extracts the blade inserted between tyre and rim.

Once the wheel has been removed, the arm is again moved to near position with respect to the bed of the tyre changing machine due to the action of the return spring.

The known bead breaking units do however have a number of drawbacks.

In particular, after bead breaking, the extraction operation of the blade inserted between the tyre and the rim must be performed manually by the operator.

This requires a far from negligible physical effort by the operator, particularly for large wheels, an effort which must often be repeated several times during the course of a day.

Furthermore, in the frequent case of the blade remaining trapped between the tyre bead and the edge of the rim, the job becomes necessary of more than one operator, with the consequent and onerous use of time and personnel.

The document no. EP20100194050 describes a bead breaking unit able to overcome such drawbacks which is able to automatically remove the blade inserted between the tyre and the rim after bead breaking In this bead breaking unit, in particular, the stem of the actuator has a thrust element which is suitable for engaging on a respective reference element on the arm during the movement of the stem itself from the retracted position to the extracted position so as to move the blade away from the wheel.

Also this known bead breaking unit, nevertheless, is susceptible to upgrading, aimed in particular at permitting greater operating versatility depending on the type of tyre to undergo bead breaking, the size of the tyre itself and/or the particular requirements of the operator using the unit.

SUMMARY OF THE INVENTION

The main aim of the present invention is to provide an upgraded bead breaking unit for tyre changing machines or the like that allows minimizing manual jobs by the operators during the bead breaking operation, and, at the same time, permit a versatile use depending on the type of tyre to undergo bead breaking, the size of the tyre itself and/or the particular requirements of the operator using the unit.

Another object of the present invention is to provide an upgraded bead breaking unit for tyre changing machines or the like which allows overcoming the mentioned drawbacks of the state of the art within the ambit of a simple, rational, easy and effective to use as well as low cost solution.

The above objects are achieved by the present upgraded bead breaking unit for tyre changing machines or the like, comprising an arm having a bead breaking tool and associated rotatable with a supporting structure between an away position, wherein said bead breaking tool is substantially spaced out from said supporting structure, and a work position, wherein said bead breaking tool is substantially placed near said supporting structure, at least an actuator apparatus having at least a mobile element associated sliding with said arm, at least a dragging device for dragging said arm, associated with said mobile element and suitable for operating during the movement of said mobile element from an extracted position to a retracted position to bring said arm to said work position and at least a temporary coupling device between said mobile element and said arm, suitable for operating during the movement of said mobile element from said retracted position to said extracted position to bring said arm from said work position to said away position, wherein said bead breaking unit comprises at least a selection device associated with said temporary coupling device and suitable for operating/disconnecting said temporary coupling device.

BRIEF DESCRIPTION OF THE DRAWINGS

Other characteristics and advantages of the present invention will become more evident from the description of a preferred, but not sole, embodiment of an upgraded bead breaking unit for tyre changing machines or the like, illustrated purely as an example but not limited to the annexed drawings in which:

FIG. 2 shows a detail of the bead breaking unit according to the invention with the selection device arranged for operating the temporary coupling device;

FIG. 3 shows a detail of the bead breaking unit according to the invention with the selection device arranged for the stop of the temporary coupling device;

Figure 1:
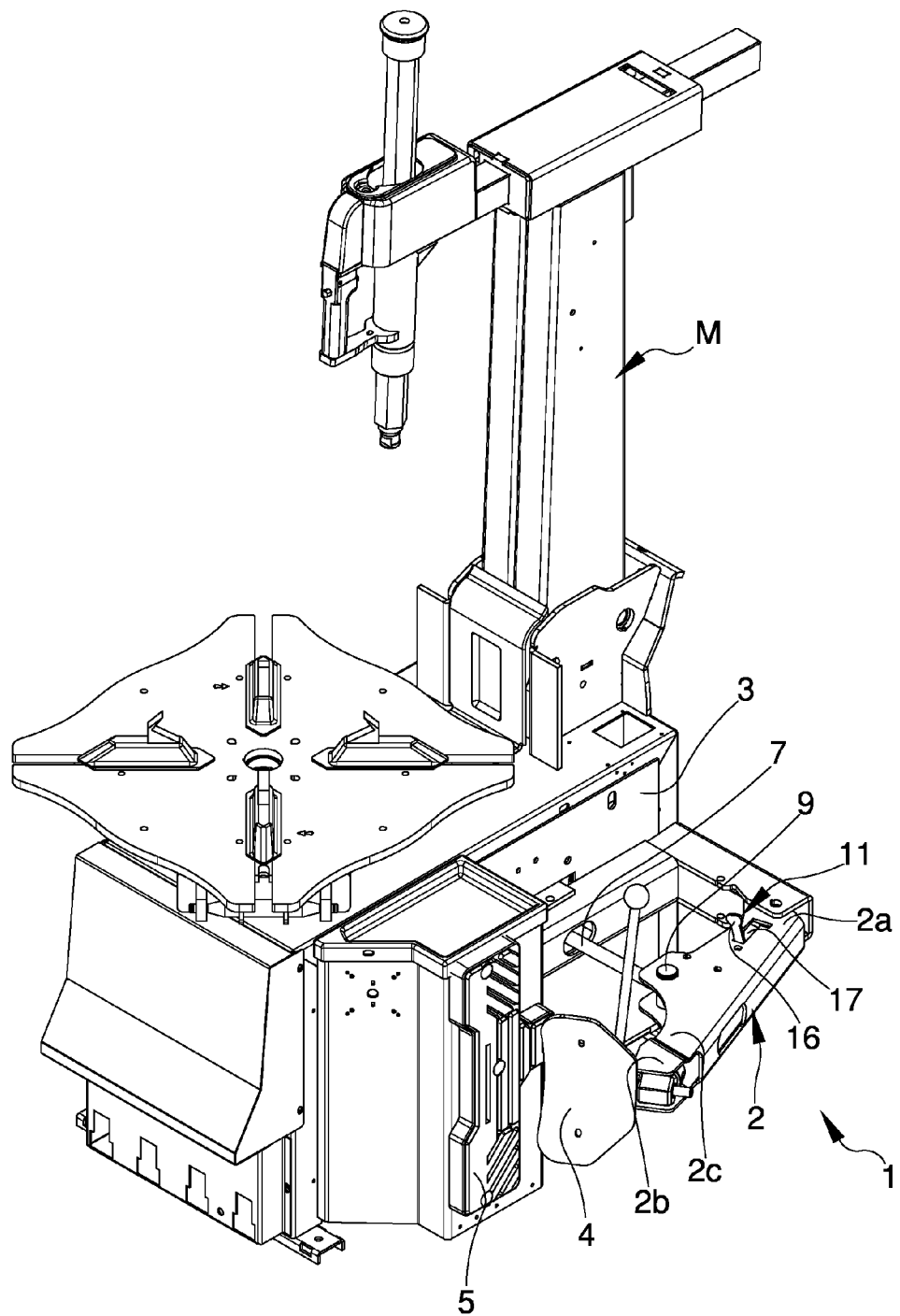
FIG. 1 is an axonometric view of the bead breaking unit according to the invention fitted on a traditional tyre changing machine.

Figures from 4 to 9 are plan views which show the operation of the bead breaking unit according to the invention with the temporary coupling device in the operating configuration.

DETAILED DESCRIPTION OF THE PREFERRED EMBODIMENTS

With particular reference to such figures, globally indicated by 1 is a bead breaking unit which can be fitted on a tyre changing machine of known type and usable for the first detachment of the bead of the tyre from the respective rim of a wheel, before the fitting/removing operation of the tyre itself.

The bead breaking unit 1 comprises an arm 2 with a first extremity 2a hinged to a supporting structure 3 and rotatable around a substantially vertical hinging axis, and a second extremity 2b having a bead breaking tool 4 of the type, e.g., of a conventional blade or the like.

The supporting structure 3 can be made up, e.g., of the bed of a traditional tyre changing machine M.

To the supporting structure 3 is fixed a supporting element 5, also called pad, usable for the correct positioning of a wheel R to undergo bead breaking The arm 2 is suitable for swinging between an away position, wherein the bead breaking tool 4 is substantially spaced out from the supporting element 5, and a work position, wherein the bead breaking tool 4 is placed substantially near the supporting element 5 and is suitable for pressing on the tyre of a wheel R to undergo bead breaking Elastic return means, not shown in the figures inasmuch as of known type, are placed between the supporting structure 3 and the arm 2 and operate to bring back the arm 2 from the away position to the work position.

The bead breaking unit 1 also comprises an actuator apparatus 6 having a mobile element 7 associated sliding with the arm 2 and moving between an extracted position and a retracted position.

In particular, with non-restricted reference to the embodiment of the bead breaking unit 1 shown in the illustrations, the actuator apparatus 6 is composed of a linear actuator, of the type of a fluid actuator cylinder or the like.

The linear actuator 6 has a fixed portion 8, made up of the liner of the linear actuator itself, hinged to the supporting structure 3 and rotatable around a substantially vertical axis. The mobile element 7 is made up of the mobile stem of the linear actuator 6.

The stem 7, in particular, is sustained axially sliding by sliding supporting means on the arm 2, schematically shown in the illustrations and indicated with the reference 9, and is moving between the retracted position, wherein it is partially housed inside the liner 8, and the extracted position, wherein it is completely extended from the liner 8.

The stem 7 has a dragging device 10 of the arm 2, suitable for operating during the movement of the stem itself from the extracted position to the retracted position to move the arm 2 to the work position.

With particular but not exclusive reference to the embodiment of the bead breaking unit 1 shown in the illustrations, the dragging device 10 is made up of a head with a substantially widened shape fastened to the free extremity of the stem 7 and suitable for engaging onto the sliding supporting means 9 during the movement of the stem itself from the extracted position to the retracted position. Different embodiments of the dragging device 10 cannot however be ruled out.

Advantageously, the bead breaking unit 1 comprises a temporary coupling device between the stem 7 and the arm 2, suitable for operating during the movement of the stem itself from the retracted position to the extracted position.

In particular, the temporary coupling device allows using the stem 7, during the movement from the retracted position to the extracted position, to move the arm 2 from the work position to the away position.

This allows automatically extracting the bead breaking tool 4 which, after the bead breaking operation, is inserted between the tyre and the rim of the wheel R.

Advantageously, the bead breaking unit 1 comprises a selection device, generally indicated in the illustrations by the reference 11, associated with the temporary coupling device suitable for operating (FIG. 2) and disconnecting (FIG. 3) the temporary coupling device itself.

The presence of the selection device 11, in particular, allows the versatile use of the bead breaking unit 1, permitting to operating or disconnecting the above temporary coupling device depending on the type of tyre of the wheel R to undergo bead breaking, the size of the tyre itself and/or the particular requirements of the operator using the bead breaking unit 1.

With particular, but not sole reference to the embodiment of the bead breaking unit 1 shown in the illustrations, the temporary coupling device comprises a thrust element 10 associated integral with the stem 7 and a reference element 12 associated with the arm 2.

The thrust element 10 is suitable for engaging on the reference element 12 during the movement of the stem 7 from the retracted position to the extracted position.

Usefully, the thrust element 10 is made up of the same head used to drive the arm 2 to the work position.

The reference element 12 is moving between an operating position, wherein it is arranged along the trajectory of the head 10, and a disengagement position, wherein it is substantially away from the trajectory of the head 10.

The above temporary coupling device also comprises a contrast elastic element 13, of the type of a thrust spring or the like, suitable for contrasting the movement of the reference element 12 from the operating position to the disengagement position.

Usefully, the temporary coupling device comprises a guide element for guiding the reference element 12 suitable for guiding the movement of the reference element itself between the operating position and the disengagement position.

In particular, the guide element of the reference element 12 comprises a sliding element 14, supporting the reference element 12, associated sliding with a straight guide element 15 fixed to the arm 2.

With particular reference to the embodiment shown in the illustrations, the sliding element 14 is made up of a pin having at one extremity the reference element 12.

The straight guide element 15 is made up of a tubular support fastened to the arm 2 and having a seat that houses the pin 14 axially sliding.

The thrust spring 13 is fitted inside the seat of the tubular support 15, around the pin 14, and operates to move the reference element 12 to the operating position.

Usefully, the reference element 12 has a first contact surface 12a which, when the arm 2 is in work position, is substantially at right angles with respect to the trajectory of the head 10.

The first contact surface 12a is suitable for being engaged by the head 10 during the movement of the stem 7 from the retracted position to the extracted position, to move the arm 2 from the work position to the away position.

The reference element 12 also comprises a second contact surface 12b which, when the arm 2 is in work position, is substantially inclined with respect to the trajectory of the head 10.

The second contact surface 12b is suitable for being engaged by the head 10 during the movement of the stem 7 from the extracted position to the retracted position, for the movement of the reference element 12 from the operating position to the disengagement position.

In particular, the first contact surface 12a and the second contact surface 12b are defined on faces of the reference element 12 substantially opposite one another.

With particular, but not sole reference to the embodiment of the bead breaking unit 1 shown in the illustrations, the selection device 11 is made up of a locking device for locking the reference element 12 in a disengagement position (FIG. 3).

Usefully, the locking device 11 comprises a retention element 16 associated integral with the reference element 12 and moving between:
- an operating position, shown in the FIG. 2, wherein the reference element 12 is free to move between the above work and disengagement positions;
- a disconnection position, shown in the FIG. 3, wherein the reference element 12 is locked in a disengagement position.

Consequently, when the retention element 16 is in the operating position, the temporary coupling device between the stem 7 and the arm 2 operates during the movement of the stem itself from the retracted position to the extracted position, allowing the use of the stem 7 for the movement of the arm 2 from the work position to the away position.

On the contrary, when the retention element 16 is in the disconnection position, the thrust element 10 on the stem 7 does not engage on the reference element 12 during the movement of the stem itself from the retracted position to the extracted position.

In this case, therefore, the movement of the arm 2 from the work position to the away position, and therefore the extraction of the blade 4 from the wheel R, can be done manually by the operator.

The locking device 11 also comprises a guide element 17 for guiding the retention element 16 between the above operating and disconnection positions.

Preferably, the guide element 17 for guiding the retention element 16 is made up of a slot obtained on the arm 2 and having:
- a first section 17a extending along a direction substantially parallel to the direction of movement of the reference element 12;
- a second section 17b extending along a direction substantially transversal to the direction of movement of the reference element 12.

In actual facts, when the retention element 16 is in the above operating position, then it is fitted sliding inside the first section 17a of the slot 17.

Instead, when the retention element 16 is in the above disconnection position, then it is fitted inside the second section 17b of the slot 17.

In this latter case, therefore, the retention element 16 is retained in the disengagement position by the edge of the second section 17b of the slot 17.

In particular, the slot 17 is obtained on a plate 2c of the arm 2. The plate 2c supports the tubular support 15 of the same temporary coupling device.

In a preferred embodiment, the retention element 16 is made up of a control lever which is fitted sliding inside the slot 17 and which extends at least in part from the slot itself to the outside of the arm 2.

Furthermore, the slot 17 is preferably shaped like an overturned L, with the first section 17a and the second section 17b straight and at right angles to one another.

Furthermore, the control lever 16 is fixed to the extremity of the sliding element 14 opposite the extremity which supports the reference element 12.

The operation of the bead breaking unit 1 is described below.

First of all, the operator uses the selection device 11 to operate or disconnect the temporary coupling device between the arm 2 and the stem 7.

In the event of the operator deciding to stop the temporary coupling device, then he/she makes the control lever 16 slide inside the first section 17a of the slot 17 until the reference element 12 shifts from the work position to the disengagement position.

Subsequently, he/she moves the control lever 16 inside the section 17b of the slot 17 (FIG. 3).

In this position, the reference element 12 is completely retracted and blocked in a disengagement position and is completely ineffective as regards the operation of the bead breaking unit 1.

In the event instead of the operator deciding to operate the temporary coupling device, then he/she makes the control lever 16 slide inside the second section 17b of the slot 17 until this is in correspondence with the first section.

The action of the thrust spring 13, therefore, returns the reference element 12 from the disengagement position to the work position (FIG. 2).

The use of the bead breaking unit 1 with the temporary coupling device in the operating position is described in detail below.

Figure 4:
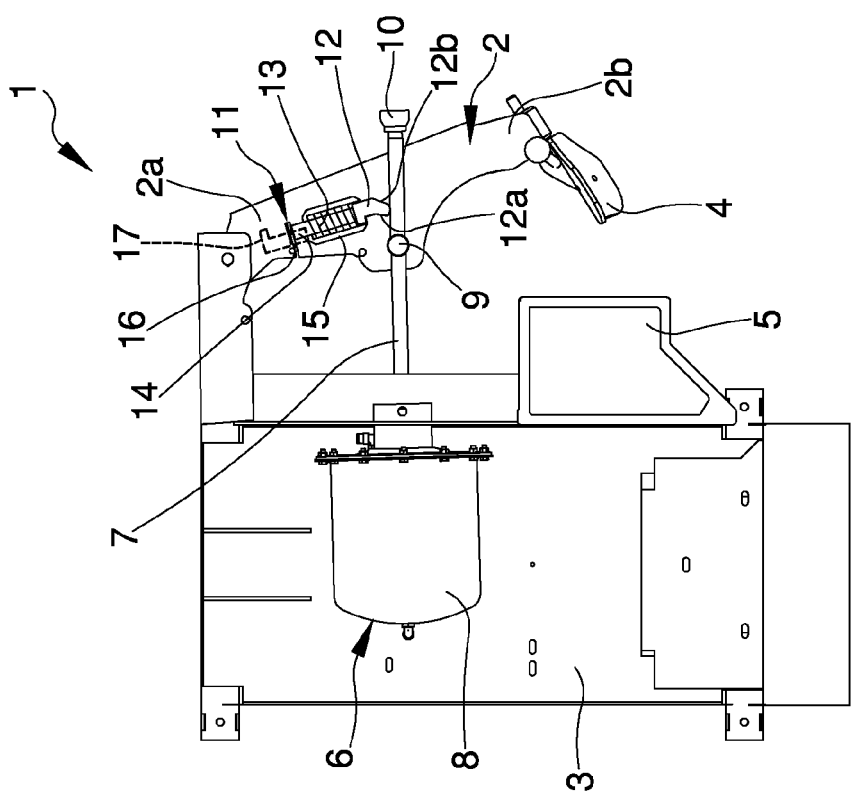

When the bead breaking unit is not used, the stem of the linear actuator is in the extracted position and, in such configuration, the arm is free to rotate around its hinging axis (FIG. 4).

Figure 5:
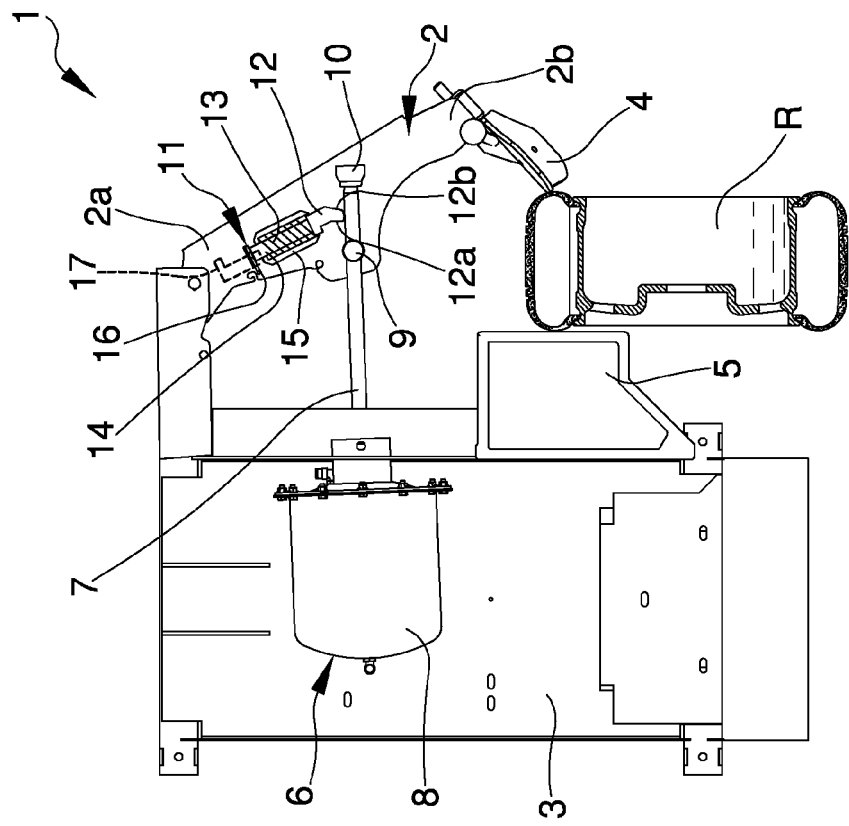

During use, first of all an operator positions a wheel R to undergo bead breaking in correspondence to the supporting element 5 and manually moves the arm 2 so as to position the bead breaking tool 4 in correspondence to a section of the tyre of the wheel R (FIG. 5).

Subsequently, the operator operates the linear actuator 6 and the stem 7 moves from the extracted position to the retracted position.

Figure 6:
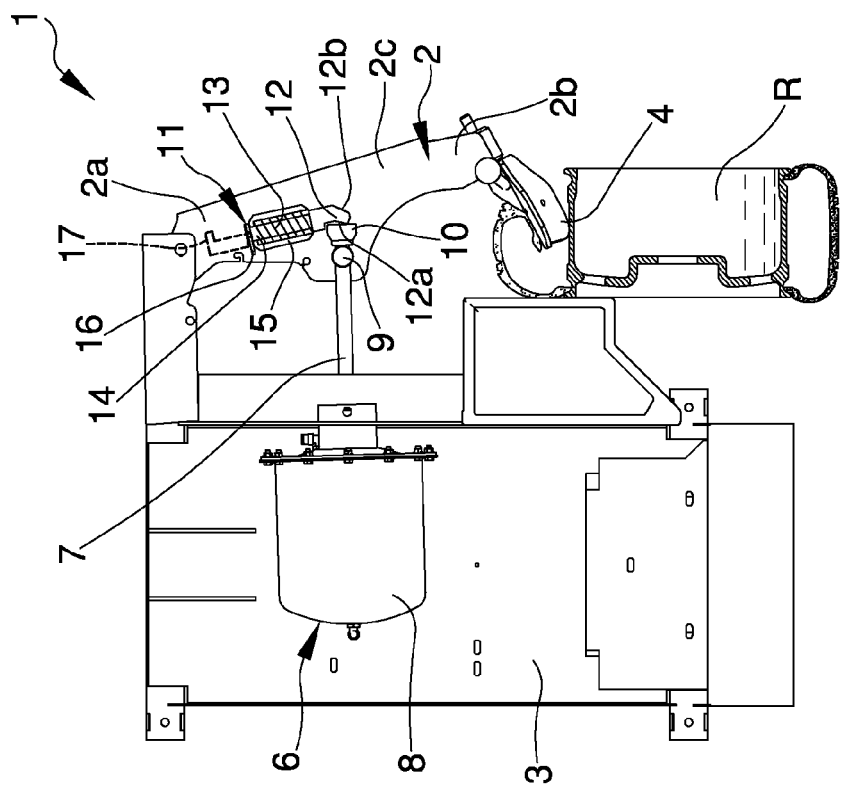

During such movement, the head 10 moves into contact with the reference element 12 and engages on the second contact surface 12b, moving the reference element itself from the operating position to the disengagement position (FIG. 6).

Once the head 10 has passed beyond the reference element 12, this is returned to the operating position by means of the thrust spring 13.

Subsequently, the head 10 engages on the sliding supporting means 9, driving the arm 2 to the work position.

Figure 7:
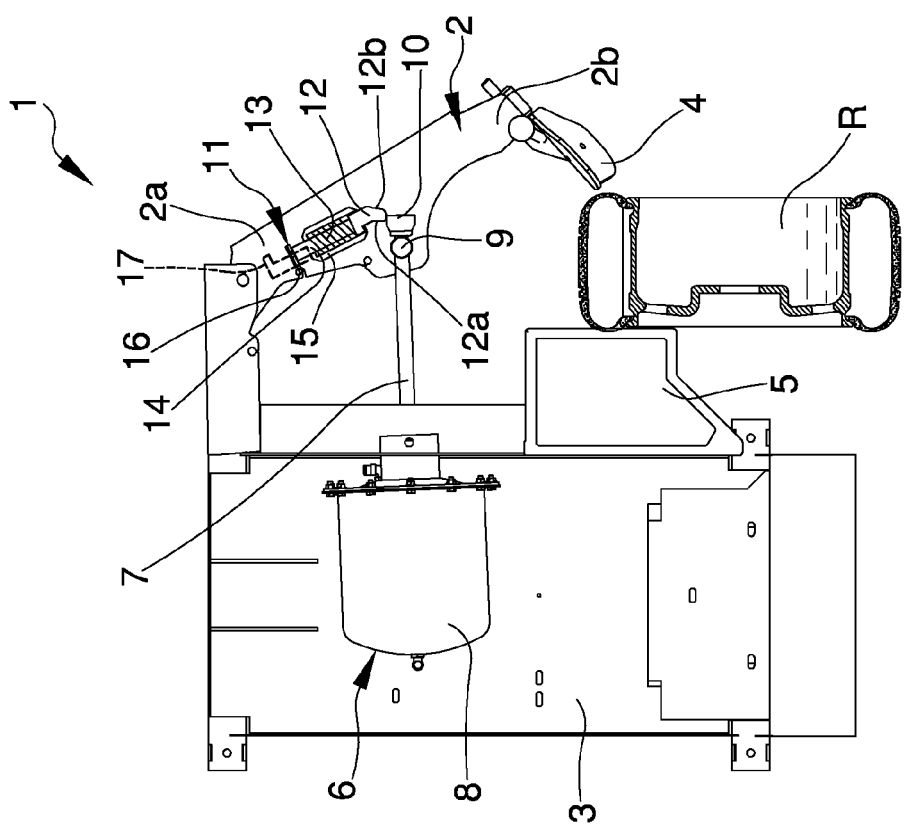

Consequently, the bead breaker tool 4 presses on the tyre of the wheel R, until the bead is moved away from the edge of the rim (FIG. 7).

The stem 7 is then moved from the retracted position to the extracted position and, during such movement, the head 10 engages on the first contact surface 12a of the reference element 12.

Figure 8:
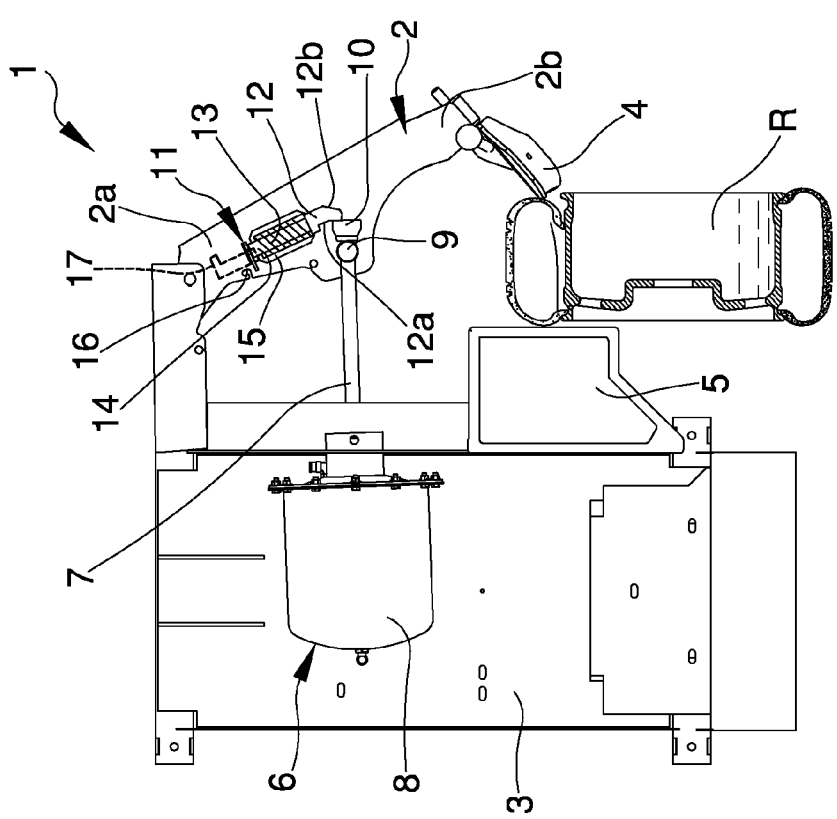

Consequently, the arm 2 is pushed to the away position and the bead breaking tool 4 is extracted and moved away from the wheel R (FIG. 8).

Figure 9:
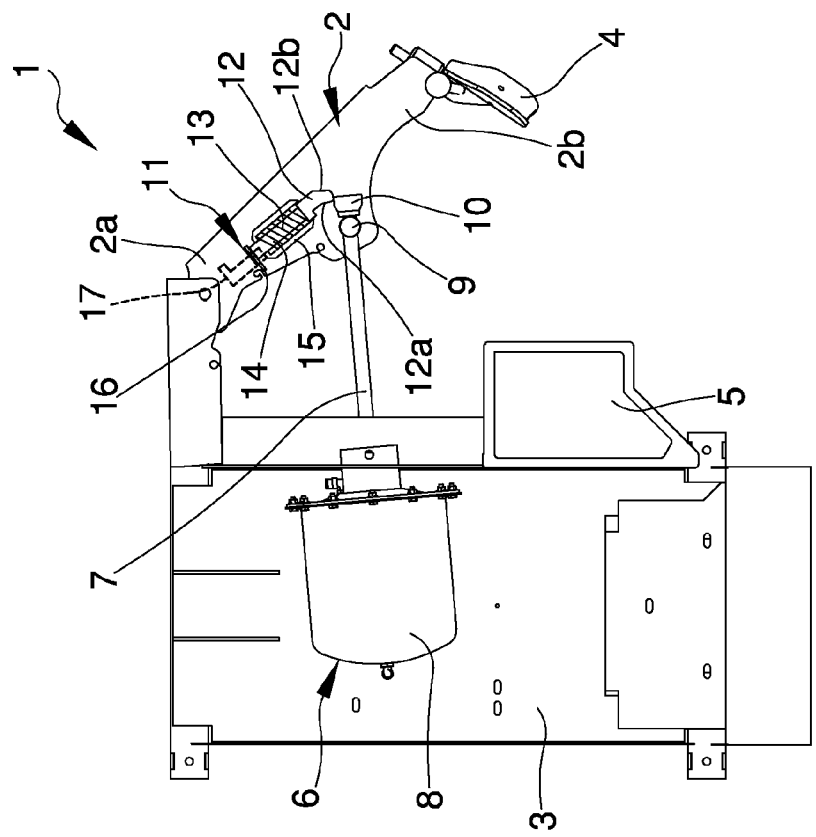

Finally, when the stem 7 reaches the extracted position, the head 10 passes beyond the reference element (FIG. 9) and the arm 2 is returned to the work position by means of the return elastic means (FIG. 4).

It has in point of fact been ascertained how the described invention achieves the proposed objects.

In particular, the fact is underlined that the temporary coupling device between the stem of the linear actuator and the arm and the selection device suitable for operating/disconnecting such temporary coupling device allows minimizing manual jobs by the operators during bead breaking and, at the same time, permit a versatile use of the bead breaking unit depending on the type of tyre to undergo bead breaking, the size of the tyre itself and/or the particular requirements of the operator using the machine.

The invention claimed is:

1. Upgraded bead breaking unit for tire changing machines or the like, comprising an arm having a bead breaking tool and associated rotatable with a supporting structure between an away position, wherein said bead breaking tool is substantially spaced out from said supporting structure, and a work position, wherein said bead breaking tool is substantially placed near said supporting structure, at least an actuator apparatus having at least a mobile element associated sliding with said arm, at least a dragging device for dragging said arm, associated with said mobile element and suitable for operating during the movement of said mobile element from an extracted position to a retracted position to bring said arm to said work position and at least a temporary coupling device between said mobile element and said arm, suitable for operating during the movement of said mobile element from said retracted position to said extracted position to bring said arm from said work position to said away position, wherein said bead breaking unit comprises at least a selection device associated with said temporary coupling device and suitable for operating/disconnecting said temporary coupling device.

2. Bead breaking unit as claimed in claim 1, wherein said temporary coupling device comprises at least a thrust element associated with said mobile element and at least a reference element associated with said arm, said thrust element being suitable for engaging on said reference element during the movement of said mobile element from said retracted position to said extracted position to bring said arm from said work position to said away position.

3. Bead breaking unit as claimed in claim 2, wherein said reference element is moving between an operating position, wherein it is arranged along the trajectory of said thrust element, and at least a disengagement position, wherein it is substantially away from the trajectory of said thrust element.

4. Bead breaking unit as claimed in claim 3, wherein said selection device comprise at least a locking device associated with said reference element and suitable for locking said reference element in said disengagement position.

5. Bead breaking unit as claimed in claim 4, wherein said locking device comprises at least a retention element associated integral with said reference element and moving between an operating position, wherein said reference element is free to move between said work position and said disengagement position, and a disconnection position, wherein said reference element is locked in said disengagement position.

6. Bead breaking unit as claimed in claim 5, wherein said locking device comprises at least a guide arrangement of said retention element suitable for guiding the movement of said retention element between said operating position and said disconnection position.

7. Bead breaking unit as claimed in claim 6, wherein said guide element of said retention element comprises at least a slot having at least a first section which extends along a direction substantially parallel to the direction of movement of said reference element and at least a second section which extends along a direction substantially transversal to the direction of movement of said reference element, said retention element being fitted sliding into said first section when it is arranged in said operating position and being fitted inside said second section when it is arranged in said disconnection position.

8. Bead breaking unit as claimed in claim 7, wherein at least one between said first section and said second section of said slot is substantially straight.

9. Bead breaking unit as claimed in claim 8, wherein said slot is substantially L-shaped.

10. Bead breaking unit as claimed in claim 5, wherein said retention element comprises at least a control lever or the like.

11. Bead breaking unit as claimed in claim 5, wherein said temporary coupling device comprises at least a guide element of said reference element suitable for guiding the movement of said reference element between said operating position and said disconnection position, said temporary coupling device comprises at least an elastic contrast element suitable for contrasting the movement of said reference element from said operating position to said disconnection position, said guide element of said reference element comprises at least a sliding element for supporting said reference element and at least a straight guide element associated with said arm, said sliding element is associated sliding with said guide element by placing in between said elastic contrast element and said retention element is fixed to said sliding element.

12. Bead breaking unit as claimed in claim 2, wherein said temporary coupling device comprises at least an elastic contrast element suitable for contrasting the movement of said reference element from said operating position to said disconnection position.

13. Bead breaking unit as claimed in claim 2, wherein said reference element comprises at least a first contact surface substantially at right angles to the trajectory of said thrust element, when said arm is in said work position, said first contact surface being suitable for being engaged by said thrust element during the movement of said mobile element from said retracted position to said extracted position, to move said arm to said away position.

14. Bead breaking unit as claimed in claim 13, wherein said reference element comprises at least a second contact surface substantially inclined with respect to the trajectory of said thrust element, said second contact surface being suitable for being engaged by said thrust element during the movement of said mobile element from said extracted position to said retracted position, to move said reference element to said disengagement position.

15. Bead breaking unit as claimed in claim 2, wherein said temporary coupling device comprises at least a guide element of said reference element suitable for guiding the movement of said reference element between said operating position and said disconnection position.

16. Bead breaking unit as claimed in claim 15, wherein said temporary coupling device comprises at least an elastic contrast element suitable for contrasting the movement of said reference element from said operating position to said disconnection position and said guide element of said reference element comprises at least a sliding element for supporting said reference element and at least a straight guide element associated with said arm, said sliding element being associated sliding with said guide element by placing in between said elastic contrast element.

17. Bead breaking unit as claimed in claim 1, wherein said actuator apparatus comprise at least a linear actuator and said mobile element is made up of at least a mobile stem of said linear actuator.

18. Bead breaking unit as claimed in claim 17, wherein said temporary coupling device comprises at least a thrust element associated with said mobile element and at least a reference element associated with said arm, said thrust element being suitable for engaging on said reference element during the movement of said mobile element from said retracted position to said extracted position to bring said arm from said work position to said away position, wherein said thrust element comprises at least a head with a substantially widened shape integrally associated with the free extremity of said stem.

* * * * *